(12) United States Patent
Thom

(10) Patent No.: US 10,271,696 B2
(45) Date of Patent: Apr. 30, 2019

(54) SYSTEMS AND APPARATUSES FOR PASSIVE URINE RECOVERY

(71) Applicant: Jerry D. Thom, Sandy, UT (US)

(72) Inventor: Jerry D. Thom, Sandy, UT (US)

(73) Assignee: Jerry D. Thom, Sandy, UT (US)

( * ) Notice: Subject to any disclaimer, the term of this patent is extended or adjusted under 35 U.S.C. 154(b) by 187 days.

(21) Appl. No.: 15/425,743

(22) Filed: Feb. 6, 2017

(65) Prior Publication Data

US 2017/0350111 A1 Dec. 7, 2017

Related U.S. Application Data

(60) Provisional application No. 62/344,111, filed on Jun. 1, 2016.

(51) Int. Cl.
| | | |
|---|---|---|
| A47K 11/02 | (2006.01) | |
| B01D 35/15 | (2006.01) | |
| E03D 9/00 | (2006.01) | |
| E03D 11/00 | (2006.01) | |
| B01D 35/153 | (2006.01) | |

(52) U.S. Cl.
CPC .......... A47K 11/026 (2013.01); B01D 35/153 (2013.01); E03D 9/00 (2013.01); E03D 11/00 (2013.01); *Y02A 50/454* (2018.01)

(58) Field of Classification Search
CPC ...... A47K 11/00; A47K 11/02; A47K 11/026; B01D 29/029; B01D 29/27; B01D 35/02; B01D 35/027; B01D 35/153; B01D 2201/167; B65D 1/04; B65D 1/06; B65D 1/067; E03D 9/00; E03D 11/00

USPC ...... 4/300, 353, 416, 449; 210/338, 448, 453
See application file for complete search history.

(56) References Cited

U.S. PATENT DOCUMENTS

| | | | | |
|---|---|---|---|---|
| 3,416,164 A | * | 12/1968 | Ekrut | A47K 11/02 4/484 |
| 3,591,870 A | * | 7/1971 | Friesen et al. | A47K 11/02 4/144.2 |
| 4,121,306 A | * | 10/1978 | Bringman | A61G 9/006 4/144.3 |
| 4,882,794 A | * | 11/1989 | Stewart, III | A47K 11/02 4/451 |
| 6,523,187 B1 | * | 2/2003 | Brink | A47K 11/06 383/37 |
| 8,266,739 B2 | * | 9/2012 | Schaaf | A47K 11/02 4/661 |

(Continued)

*Primary Examiner* — Joseph W Drodge
(74) *Attorney, Agent, or Firm* — Workman Nydegger

(57) ABSTRACT

Systems and apparatuses for allowing passive urine recovery are disclosed. An exemplary commode liner that allows for passive urine recovery comprises a first layer comprising a first top side configured to receive a bio-waste material, a first bottom side, and a plurality of apertures spanning the first top side and the first bottom side, wherein the plurality of apertures passively promote a unidirectional movement of a liquid portion of the bio-waste material from the first top side to the first bottom side. The liner further comprises a second layer attached to the first layer, wherein the second layer is attached to the first layer such that a space is created between a second top side of the second layer and the first bottom side of the first layer, wherein the space is configured to hold a liquid portion of the bio-waste material received at the first top side.

19 Claims, 9 Drawing Sheets

(56) References Cited

U.S. PATENT DOCUMENTS

| | | | |
|---|---|---|---|
| 2009/0165199 A1* | 7/2009 | Heumann | A47K 11/02 4/483 |
| 2014/0157505 A1* | 6/2014 | Cheung | A47K 11/02 4/483 |
| 2016/0106609 A1* | 4/2016 | Russell | A47K 11/105 4/452 |
| 2016/0122994 A1* | 5/2016 | Thom | B60P 1/04 414/354 |

* cited by examiner

SYSTEMS AND APPARATUSES FOR PASSIVE URINE RECOVERY

CROSS-REFERENCE TO RELATED APPLICATIONS

This application claims priority to U.S. Provisional Patent Application No. 62/344,111 filed Jun. 2, 2016, entitled "Systems and Apparatuses for Passive Urine Recovery," which is incorporated herein by reference in its entirety.

BACKGROUND

Technical Field

The present disclosure relates generally to the conservation of natural resources. More particularly, the present disclosure is directed to collecting liquid bio-waste for potential repurposing.

Background and Relevant Art

Clean, fresh water is a precious and finite natural resource, but most developed countries perplexingly use this resource as a medium for transporting human-derived bio-waste. Consequently, the average person in a developed country fouls anywhere from 35-70 liters of fresh water per day with their excreta, depending on the flush volume of the toilet being used. This heavy reliance on water to dispose of human bio-waste places an unnecessary strain on the already limited supply of fresh water and also places the world's fresh water supply at risk of contamination with pathogens. This is evident by the sheer volume of fresh water tainted on a daily basis with pathogen rich excrement but it is further exacerbated when, as is far too often the case, this pathogen-rich slurry contaminates an otherwise clean body of fresh water.

Recently, waterless bio-waste disposal technologies have come to light, providing an ecologically friendly alternative to the traditional flush toilets and easing the burden on the fresh water supply. However, these alternative waste-disposal devices, such as outhouses and portable commodes, fail to provide systems or apparatuses for recovering urine from deposited bio-waste. In the case of an outhouse, bio-waste is indiscriminately heaped into an underground container or hole, and once any additional excreta is disposed of at this undifferentiated pile of putrescent waste, the utility of urine deposited therein is quickly sullied. There are no known means for separating the liquid and solid bio-waste at an outhouse, and specifically, there are no known means for recovering urine at an outhouse.

Portable commodes similarly fail to allow the recovery of urine from deposited bio-waste. Instead of hoarding iterative bouts of waste at a single cache-like an outhouse—many portable commodes are more similar to the traditional flush toilet in that they are geared towards handling single session waste disposal events. Some portable commodes can be fitted with a liner for capturing such deposited bio-waste, but all known liners fail to separate liquid and solid bio-waste. Instead, known commode liners typically use absorbent materials (e.g., sawdust) to transform liquid bio-waste into a solid-like phase rather than recovering it in its native liquid state. Accordingly, current portable commode technologies also do not solve the problem of recovering urine from bio-waste.

Both the traditional gravity-based bio-waste disposal systems using water as a bio-waste carrier as well as the more ecologically friendly waterless bio-waste disposal systems discard or wholly ignore a valuable and underutilized resource—human urine. Human urine is versatile: it is roughly 95% water and can be filtered for use as potable water.

Even unfiltered, urine can be used as an effective plant fertilizer to increase the size and crop yield of vegetable produce. Plants require six primary elements to grow: carbon, hydrogen, oxygen, nitrogen, phosphorus, and potassium. Plants can obtain the first three elements—carbon, hydrogen, and oxygen—from air and water. The latter three—nitrogen, phosphorus, and potassium—are obtained from the soil. However, soil often does not contain adequate concentrations of these essential elements to foster optimum plant growth. Consequently, it is common practice by many gardeners and farmers to supplement their plant soil with a fertilizer containing nitrogen, phosphorus, and potassium. Owing to its naturally sterile properties and balanced concentrations of nitrogen, phosphorus, and potassium, human urine makes for an effective plant fertilizer.

Another obvious advantage of human urine is that, being a natural byproduct of metabolism, it is produced regularly and essentially without cost. The average person generates about 1.5 liters of urine per day, and despite the aforementioned benefits and versatility of urine, urine is rarely collected to help replenish the potable water supply and is also rarely collected for use as a plant fertilizer. Instead, common daily practice is to reiteratively micturate into a toilet bowl for the sole purpose of transporting the urine, with or without excrement, to a distant reservoir of polluted water. This vacuous spoiling of countless liters of fresh water on a daily basis can be attributed to a lack of adequate urine recovery systems and apparatuses. Particularly, there is a striking lack of urine recovery systems available for use with waterless bio-waste disposal systems.

Accordingly, there are a number of disadvantages in the art of natural resource conservation that can be addressed.

BRIEF SUMMARY

Implementations of the present disclosure comprise systems and apparatuses that aid in the conservation of natural resources. In particular, implementations of the present disclosure comprise systems and apparatuses for passive urine recovery from bio-waste material. Additionally, implementations of the present disclosure can promote the recycling of liquid bio-waste material such that it may be utilized, for example, as a fertilizer.

For example, embodiments of the present disclosure provide a liner for a commode that allows passive urine recovery. The liner comprises a first layer and a second layer attached to the first layer, wherein a space is created between the attached first and second layers. The first layer of the liner comprises a first top side configured to receive bio-waste, a first bottom side, and a plurality of apertures spanning the first top side and the first bottom side, wherein the plurality of apertures passively promote a unidirectional movement of a liquid portion of bio-waste material from the first top side to the first bottom side and at least partially restrict the movement of the liquid portion from the first bottom side to the first top side. The second layer of the liner comprises a second top side disposed adjacent to the first bottom side of the first layer. The space defined between the first layer and the second layer is configured to hold a liquid portion of the bio-waste material received at the first top side.

In at least one embodiment of the present disclosure, the liner may further comprise a closure mechanism configured to substantially close the liner such that the bio-waste material is substantially retained within the liner when the liner is substantially closed. The liner according to one or more embodiments of the present disclosure may comprise a mounting mechanism for removably securing the liner to a commode. In some embodiments, the commode comprises a basin. In some embodiments, the commode comprises a bio-waste cart.

In some embodiments, a system for passive urine recovery comprises a bio-waste cart receivable at least partially within a bio-waste receptacle, the bio-waste cart comprising a base and a basin for receiving bio-waste deposited at the bio-waste receptacle. The system further comprises a liner associated with the basin of the bio-waste cart, the liner comprising a first layer comprising a first top side configured to interface with a bio-waste material received at the bio-waste receptacle, a first bottom side, and a plurality of apertures spanning the first top side and the first bottom side. The liner further comprises a second layer attached to the first layer and comprising a second top side disposed adjacent to the first bottom side, wherein a space is created between the second top side and the first bottom side, wherein the space is configured to hold a liquid portion of bio-waste material interfacing with the first top side of the first layer of the liner.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered limiting of its scope. In the drawings, multiple instances of an element may each include separate letters appended to the element number. For example, two instances of a particular element "200" may be labeled as "200a" and "200b." In that case, the element label may be used without an appended letter (e.g., "200") to generally refer to every instance of the element, while the element label will include an appended letter (e.g., "200a") to refer to a specific instance of the element. Similarly, a drawing number may include separate letters appended thereto. For example, FIG. 2 may include FIG. 2A and FIG. 2B. In that case, the drawing number may be used without the appended letter (e.g., FIG. 2) to generally refer to every instance of the drawing, while the drawing label will include an appended letter (e.g., FIG. 2A) to refer to a specific instance of the drawing. The disclosure will be described and explained with additional specificity and detail through the use of the accompanying drawings in which.

DETAILED DESCRIPTION

Figure 1:
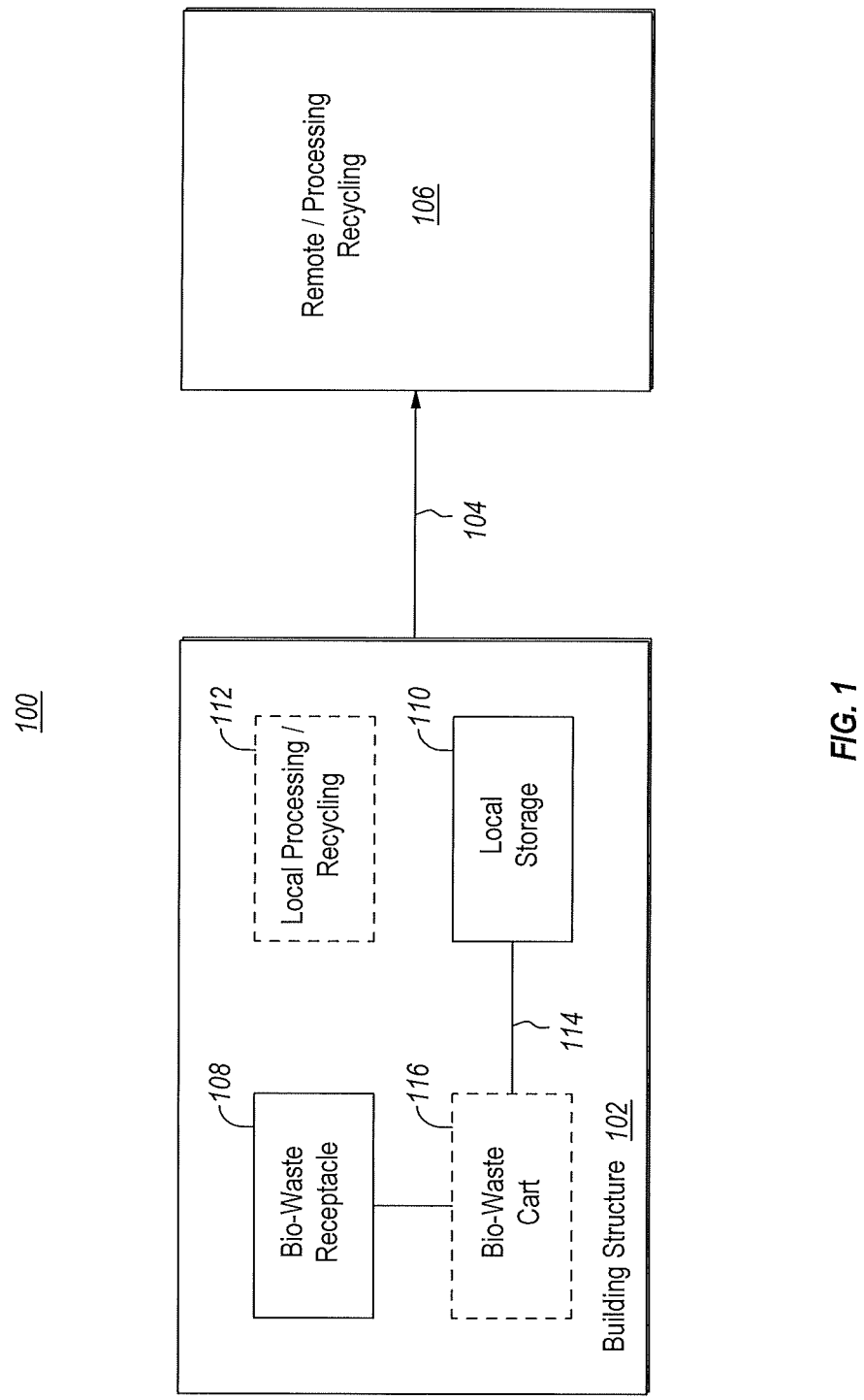
FIG. 1 illustrates a schematic representation of a system for collecting, transporting, and processing bio-waste.

In the following detailed description, reference is made to the accompanying drawings, which form a part hereof. In the drawings, similar symbols typically identify similar components, unless context dictates otherwise. The embodiments in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and as illustrated in the figures, can be arranged, substituted, combined, separated, and designed in a wide variety of different configurations, all of which are explicitly contemplated herein. It will also be understood that any reference to a first, second, etc. element in the claims or in the detailed description is not meant to imply numerical sequence but is meant to distinguish one element from another unless explicitly noted as implying numerical sequence.

In addition, as used in the specification and appended claims, directional terms such as "top," "bottom," "up," "down," "upper," "lower," "proximal," "distal," "horizontal," "vertical," and the like are used herein solely to indicate relative directions and are not otherwise intended to limit the scope of the invention or claims.

Implementations of the present disclosure extend to systems and apparatuses that aid in the conservation of natural resources. In particular, implementations of the present disclosure comprise systems and apparatuses for passive urine recovery from bio-waste material. Additionally, implementations of the present disclosure can promote the recycling of liquid bio-waste material such that it may be utilized, for example, as a fertilizer.

Accordingly, embodiments of the present disclosure provide apparatuses and systems for passive urine recovery, which can act to conserve natural resources through repurposing bio-waste. For example, embodiments of the present disclosure may be used to recover urine from commodes for subsequent use replenishing the potable water supply, for use as a fertilizer, or for any other useful pursuit to which fresh water may be employed. Further, implementations of this disclosure can promote a safer and more hygienic alternative for physically separating liquid and solid bio-waste. The systems and apparatuses described herein make it possible to more easily, safely, and hygienically collect and partially separate liquid and solid bio-waste at the source of bio-waste deposition.

Existing technologies are not well equipped to directly recover urine from deposited bio-waste. For example, traditional flush toilets fail to provide any mechanism for recovering urine from deposited excreta. Instead, these systems use a toilet bowl as a temporary holding site for deposited bio-waste without separating urine from feces. In fact, flushing toilets perform the opposite of separating urine and feces—these systems actively combine the two forms of bio-waste. Upon flushing, toilet bowl contents are subjected to a gravity-fueled vortex, which acts to at least partially homogenize the bio-waste, not separate it.

Embodiments of the present disclosure provide systems and methods for passively recovering urine from commodes. In some embodiments, a liner is provided for receiving deposited bio-waste that comprises two layers—a first, upper layer and a second, lower layer. The second, lower layer is attached to the first, upper layer such that a space is created between the first, upper layer and second, lower layer. The first, upper layer comprises a first top side, a first bottom side, and a plurality of apertures that span the first top side to the first bottom side and passively promote the unidirectional movement of a liquid portion of bio-waste material from the first top side to the first bottom side and at least partially restrict the movement of the liquid portion from the first bottom side to the first top side. The first top side of the first, upper layer is configured to receive bio-waste material and the space is configured to hold a liquid portion of bio-waste material received at the first top side.

In some embodiments, bio-waste consisting of both liquid and solid portions is received at the first layer of a two-layer liner. The first layer of the liner contains one or more apertures that allow for the passive unidirectional transport of the liquid portion of the bio-waste from the first layer to a space between the first and second layers where the transported liquid bio-waste is retained. The first layer also acts as a kind of barrier to the solid portion of bio-waste, restricting it to the upper liner. In this manner, the liner at least partially separates the liquid and solid portions of received bio-waste.

In some embodiments, the apertures are defined by the first layer, spanning the first layer from the first top side to the first bottom side and promote the movement of liquid from the first top side of the first layer to the first bottom side of the first layer. Said apertures may, in some embodiments, be rigidly defined such that they remain open at all times, having the potential for facilitating bidirectional movement of fluids between the first and second layers. In other embodiments, the apertures may be flexible and/or selectively open, having the potential for facilitating unidirectional, selectively directional, and/or bidirectional movements of fluids between the first and second layers. In some embodiments, the apertures may restrict the movement of fluids from the first bottom side to the first top side of the first layer. The apertures serve as a means for separating the liquid and solid bio-waste received at the liner.

In some embodiments received bio-waste is at least partially separated at the liner, and the liner can be closed and/or sealed such that the two phase-differentiated portions of bio-waste remain at least partially separated during storage and/or transportation of the closed and/or sealed liner. Embodiments where the phase-differentiated bio-waste is at least partially separated may be advantageous, for example, when processing the bio-waste. Processing bio-waste may include repurposing and/or recycling different phases of the bio-waste separately, and having the liquid and solid bio-waste in separate compartments within the liner may preclude some initial processing steps that may otherwise occur when the two forms are together. In some embodiments, the solid bio-waste may be compacted and/or dried for use as a fuel source, and in such embodiments, the solid portion of bio-waste likely requires less dehydration as at least a portion of the water content has already been removed to the compartment of the liner housing the liquid portion of the bio-waste.

In embodiments where the liquid portion of bio-waste substantially comprises urine, having the liquid portion separated from the solid portion allows for quicker, easier, and more hygienic isolation, processing, and/or repurposing of the urine. In some embodiments, the second (or functionally analogous) layer of the liner may be perforated during processing, allowing the urine to leak out for singular and/or batch processing by methods known in the art. For example, harvested urine may be filtered to generate potable water or it may be diluted for use as plant fertilizer. Any of the foregoing processing events may include sterilization steps that remove any living or non-living microbes (e.g., bacteria, viruses, yeast, etc.), toxins, and/or chemical impurities from the urine.

Urine recovered within the space created by the first and second layers of the liner (or their functional equivalents) may also be harvested by detaching a portion of the liner. In some embodiments, the first, upper layer may detach from the second, lower layer leaving the contents held by the second, lower layer exposed and readily accessible. In another embodiment, the second, lower layer may be detached from the first, upper layer, but there may be a third, intermediate layer interposed between the first, upper layer and the second, lower layer that attaches to the second, lower layer to seal the contents held by the second, lower layer. In such an embodiment, the third, intermediate layer may be attached (e.g., seamlessly, seamed, releasably, etc.) to the second, lower layer such that when detached from the first, upper layer, the third, intermediate layer and second, lower layer form a bladder-like container. A bladder-like container as described above provides multiple benefits, one example of which being that it allows for the collected urine to be transported, processed, and/or recycled at a local and/or remote processing site, which may be different than the processing and/or recycling site for solid bio-waste, and this may be done while retaining substantially all or at least a portion of its contents and without contaminating the urine by processing/recycling it with solid bio-waste.

Referring now to FIG. 1, depicted is an exemplary system 100 for collecting, transporting, and processing/recycling bio-waste. In some embodiments, the system 100 does not require the use of water as a carrier of the bio-waste. Rather, the bio-waste is transported from a building structure 102 along a transportation network 104 via mechanical and/or electro-mechanical means, such as, for example, by automated electronic bio-waste carriers to a remote processing/recycling facility 106. The transportation network 104 may include a rail system and may, in some embodiments, be a repurposed subterranean transportation network such as, for example, the known infrastructure for transporting sewage. In such an embodiment, one or more pipes for transporting sewage will be repurposed for waterless transport of bio-waste.

In some embodiments, the building structure 102 comprises one or more bio-waste receptacles 108, where users deposit bio-waste material. The deposited bio-waste material may be held in a local storage repository 110, which may be separate from at least one bio-waste receptacle 108. Additionally or alternatively, the local repository may be part of at least one bio-waste receptacle. For example, bio-waste material received at a bio-waste receptacle may be at least partially packaged and/or sealed following receipt of the bio-waste load, and the at least partially packaged and/or sealed bio-waste may then be held within a repository located on and/or within the bio-waste receptacle.

In some embodiments, bio-waste received at bio-waste receptacle 108 is transported along a transportation network 114 within the building structure 102 to the local storage repository 110. This may be done using one or more bio-waste carts 116 as known in the art. Building structure 102 may further comprise a local processing/recycling facility 112 for partially and/or fully processing one or more components of bio-waste collected within building structure 102. In some embodiments, the local processing/recycling center 112 may harvest collected urine from the bio-waste and send the remaining solid bio-waste for further processing at the remote processing/recycling facility 106. The local processing/recycling facility 112 may alternatively process the solid bio-waste and send the collected liquid and/or urine bio-waste to the remote processing/recycling facility 106 for processing and/or recycling.

In some embodiments, processing/recycling bio-waste may include treating the liquid bio-waste with sterilizing agents, such as chemical or physical sterilizing agents. For example, collected urine may be treated with ultraviolet light at a sufficient intensity and duration known in the art for sterilizing a fluid that may contain infectious (or even non-infectious) microbes. This may include a pre-filtration step to remove debris from the liquid bio-waste and/or urine. As a further example, the liquid bio-waste may be treated with an alkylating agent or an acid that respectively increases or decreases the pH of the liquid bio-waste to levels that neutralize and/or denature protein-based toxins, viral capsids, prokaryotic, single-celled eukaryotic life forms and/or any combination of the foregoing. Other sterilizing agents and methods known in the art also fall within the scope of sterilizing agents that may be used to process liquid bio-waste. Additionally or alternatively, the liquid bio-waste, especially in the case of urine, may be filtered through methods known in the art for generating potable water. Urine may also be collected for later applications and/or repurposing, such as, for example, for use as a plant fertilizer.

Figure 2A:
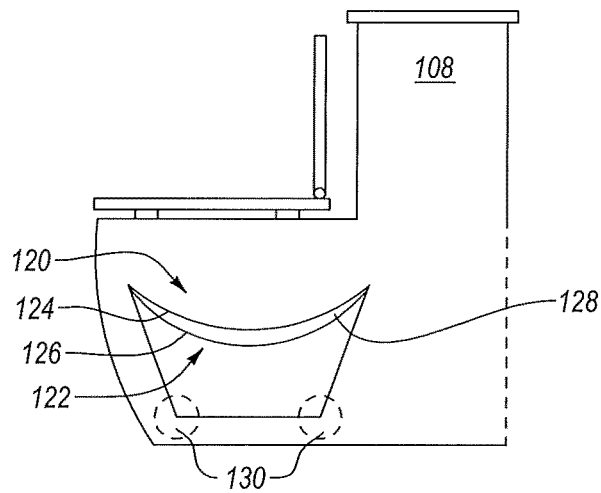
FIG. 2A illustrates an embodiment of a commode for receiving bio-waste.

Referring now to FIG. 2A, depicted is a bio-waste receptacle 108 that includes a basin 120 for receiving bio-waste. The basin 120 may be fixedly or removably housed within bio-waste receptacle 108, or the basin may, in some embodiments be a bio-waste receptacle, itself. The basin may be of any geometric shape or combination of geometric shapes, including without limitation circular, elongate, and polygonal (e.g., triangular shaped, quadrilateral shaped, pentagonal shaped, etc.). In some embodiments, the basin and/or bio-waste receptacle may be shaped and/or comprise an upper surface that is ergonomic. For example, an upper surface interfacing with the user may be ergonomically shaped to comfortably receive and hold buttocks, as known in the art.

The basin 120 may comprise one or more wheels 130 that allow the basin to be mobile, similar to one or more mobile bio-waste carts known in the art. In such an embodiment, the basin 120 may translocate between one or more bio-waste receptacles, recycling/processing facilities, and/or storage repositories.

As depicted in FIG. 2, basin 120 comprises a liner 122. In some embodiments, the liner 122 may be removably attached to basin 122. The liner may be attached to the basin by any means known in the art, including without limitation a mounting mechanism such as, for example, a hook and loop systems, a tenon and mortise pair, an adhesive, a latch, a strap, a tie, a stretchable lip configured to retractably expand in one or more directions so that the liner may be attached to the basin and held in an attached position by tensive and/or compressive forces, any number or combination of one or more of the foregoing, or any number and combination of other mounting mechanism known in the art.

The mounting mechanism may, in some embodiments, have complementary portions of the mounting mechanism divided between the liner and the basin. For example, the mounting mechanism may comprise a mortise on the liner with a complementary tenon disposed on the basin. As another non-limiting example, the mounting mechanism may comprise a notch disposed on the basin with a complementary mounting cord on the liner, wherein the mounting cord comprises a first girth and a second girth. The first girth of the mounting cord may be of a smaller diameter than the second girth and may also be sufficiently sized so as to pass between the two opposing sides of the notch, and the second girth of the mounting cord may be of a larger diameter than the first girth such that when the mounting cord is passed over the notch, and the portion of the mounting cord having the first girth is spanning the notch, the portion of the mounting cord having a second girth is too large to pass through the notch. Tension between the larger diameter portion of the mounting cord and the notch allows the liner to be attached to the basin.

Figure 2B:
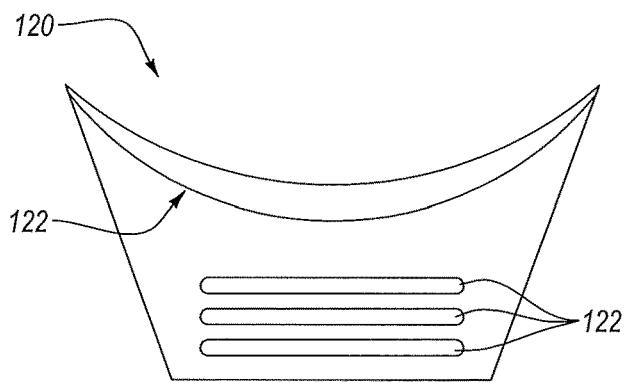
FIG. 2B illustrates an embodiment including a basin and unused liners.

FIG. 2A illustrates liner 122 attached to basin 120, and liner 122 includes a first layer 124, a second layer 126, and a space 128 created between the first and second layer. In FIG. 2B, liner 122 is suspended within basin 120, and one or more additional liners 122 are stored in the basin 120 beneath liner 122. In some embodiments, the liners 122 stored in the basin 120 are unused liners. The liners 122 stored in basin 120 may be stored in a prone, flat configuration such that the liners are stacked, as depicted in FIG. 2B. In some embodiments, the liner 120 is a single use liner, such that once the liner is used, it is removed from the basin 120. Storing additional liners in basin 120 may have many advantages, including the convenience of having fresh, unused liners that can be used to replace the used liners removed from the basin.

Figure 2C:
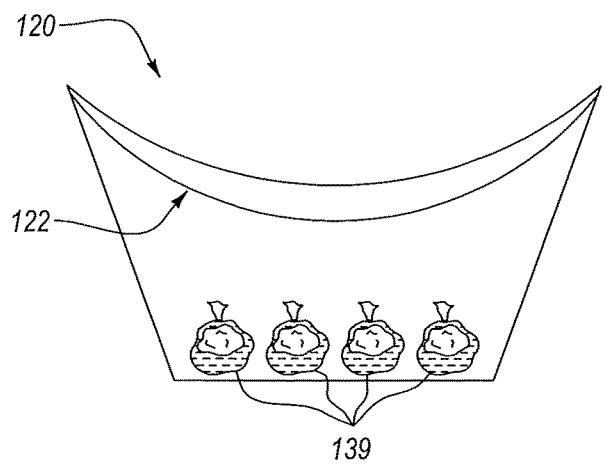
FIG. 2C illustrates an embodiment with a basin storing a plurality of used liners.

FIG. 2C similarly depicts a liner 122 suspended in basin 120. Further illustrated in FIG. 2C, used liners 139 are stored beneath liner 122. The used liners 139, as depicted in FIG. 2C, are closed and/or sealed. Closing and/or sealing a liner 122 may be accomplished by any means known in the art, including without limitation via pull ties that cinch together the perimeter portion of the first layer or some other non-perimeter portion of the first layer that, when cinched, encloses at least a portion of the first layer. Other means for closing and/or sealing the liner may include interlocking grooves and ridges that form a tight seal when pressed together, a belt, or fusing opposing ends of the first layer together using heat or chemicals. In some embodiments, closure of the first layer seals all contents of the liner within the liner, whether the contents are on the first layer or within the space created by the first layer and the second layer. In some embodiments, the first layer and the second layer may be separately sealed by any of the foregoing mechanism or combinations thereof. Regardless of the mechanism by which liners may be sealed, used liners may be stored within the basin 120 and transported and/or processed in batches in addition to or alternatively from transporting and/or processing used liners one at a time.

Figure 3A:
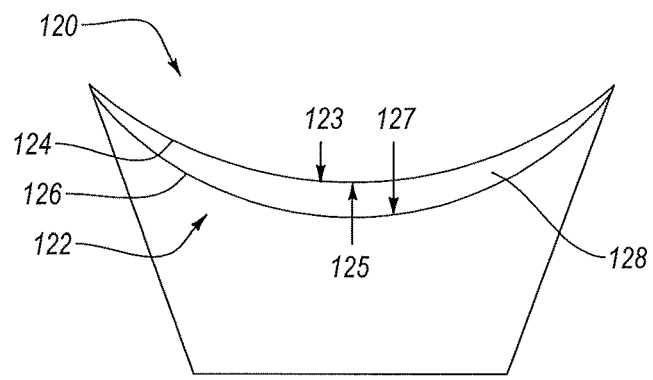
FIG. 3A illustrates an embodiment that includes a basin with an associated liner.

Referring now to FIG. 3A, liner 122 is suspended within basin 120. Liner 122 comprises a first layer 124 having a top surface 123 and a bottom surface 125, a second layer 126 having a top surface 127, and a space created between the first layer and the second layer, particularly created between the bottom surface 125 of the first layer and the top surface 127 of the second layer. As previously described, the liner may have one or more additional layers, including without limitation an intermediate layer disposed between the first and second layer that allows for the generation of a bladder like container defined by the second and intermediate layers. In some embodiments, when the first layer is closed by any of the means previously described, the bladder like container may be disconnected from the first layer forming two separate enclosed containers.

Figure 3B:
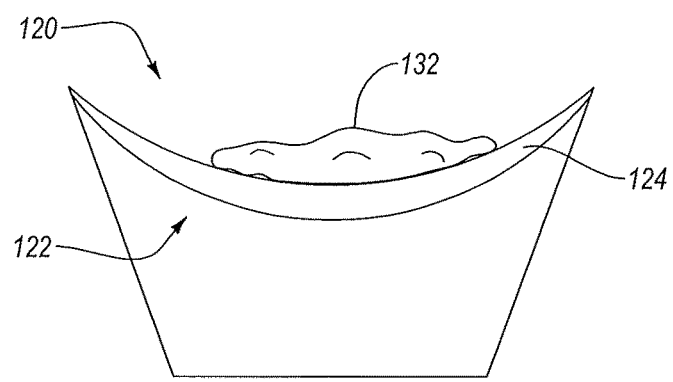
FIG. 3B illustrates the embodiment of FIG. 3A with the liner having bio-waste deposited thereon.
Figure 3C:
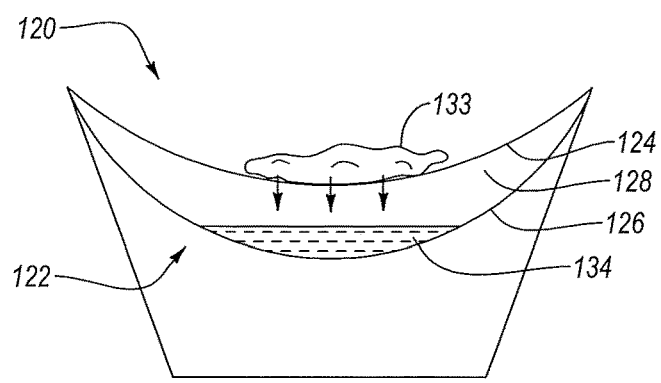
FIG. 3C illustrates the passive transport of a liquid portion of bio-waste through a liner.

FIGS. 3B-C illustrate one implementation of the liner described in FIG. 3A. For example, a user deposits bio-waste 132 onto liner 122 by interacting directly or indirectly with the basin 120. The bio-waste 132 includes a liquid portion and a solid portion. In some embodiments, the bio-waste deposited at the basin comprises a liquid portion only (e.g., urine only), a solid portion only (e.g., feces only), or any proportional concentration and combination of liquid and solid bio-waste. In some embodiments, the first layer 124 catches the bio-waste 132 and retains the solid portion 133 at the top surface 123 of the first layer. The liquid portion 134, or at least a portion of the liquid portion, passes through the first layer and rests on the second layer 126, being contained within space 128.

Figure 4A:
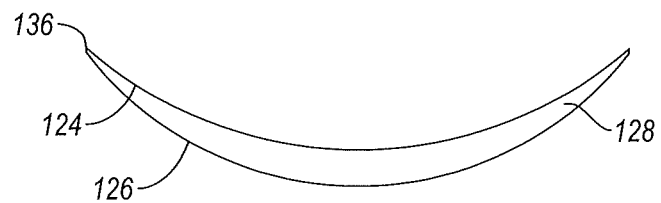
FIG. 4A illustrates a schematic representation of a vertical cross-section of an exemplary liner.
Figure 4B:
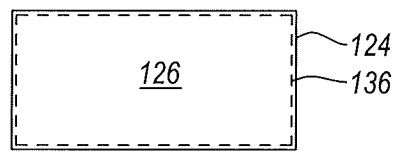
FIG. 4B illustrates a schematic representation of one embodiment of a bottom up view of the liner depicted in FIG. 4A.
Figure 4C:
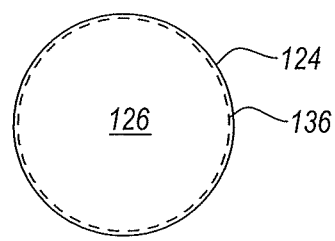
FIG. 4C illustrates a schematic representation of one embodiment of a bottom up view of the liner depicted in FIG. 4A.

The space created by the first layer and the second layer may vary, which may, for example, affect the total volume of fluid contained within the space. By varying the size, shape, and/or type of material used in the first and second layers, the total volume within the space may be augmented, and it may have additional ranging affects on one or more other properties associated with the liner. For example, FIG. 4A illustrates a vertical cross section of a liner with a first layer 124 and a second layer 126 with a space 128 created between the first and second layers 124, 126. In the depicted embodiment, the first and second layers 124, 126 are connected at the edge or substantially close to the edge of both the first and second layers 124, 126. This may be better illustrated in FIGS. 4B-C, which depict bottom-up views of the liner shown in FIG. 4A. The depicted liner comprises a first layer 124 connected to a second layer 126 at perimeter edge 136. As depicted in FIGS. 4B-4C, the first and second layers 124, 126 may be similarly shaped, and although the first and second layers 124, 126 of FIGS. 4B-4C are illustrated as being rectangular (FIG. 4B) and circular (FIG. 4C), it will be understood by one having ordinary skill in the art that the first and second layers may be of any shape, including without limitation polygonal, elongate, and/or combinations thereof.

As depicted in FIG. 4, the first and second layers 124, 126 are substantially the same shape. However, in some embodiments, the first and second layers may be similarly shaped but differently sized. For example, FIG. 4A depicts a first and second layer 124, 126 having substantially the same shape, but the layers are of different sizes. The second layer 126 is depicted as having a larger circumference, and therefore an inherently larger surface area, than the first layer 124. When the first and second layers 124, 126 are connected at their perimeter edge 136, the circumference of the larger second layer 126 is constricted to the smaller circumference provided by the first layer 124. In turn, the larger surface area of the second layer 126 is similarly confined to a smaller two-dimensional area, which allows the second layer 126 to protrude away from the first layer 124, thereby creating and/or defining the space 128 between the first and second layer 124, 126. Particularly, the space 128 may be defined by the opposing surfaces of the first and second layers 124, 126. More particularly, and as shown in FIG. 3A, the space 128 may be defined by the first bottom side 125 of the first layer 124 and the second top side 127 of the second layer 126, and the surface area of the first bottom side 125 is less than the surface area of the second top side 127.

Accordingly, the volume of space 128 may be adjusted (e.g., made larger or smaller) based on a proportional difference in size (e.g., length of circumference) between the first and second layers 124, 126. Generally speaking, the volume of a space created by joining the circumferences of first and second layers of a liner may be determined based on a circumferential ratio of the first and second layers, wherein the circumferential ratio equals $x{:}y$ $\{x<y,\ x,\ y\in$ $\mathbb{R}^+$}. The volume of said space may be decreased if the circumferential ratio x:y is changed to a circumferential ratio of x:a {a<y, a∈$\mathbb{R}^+$} or if the circumferential ratio is changed to b:y {b>x, b∈$\mathbb{R}^+$}. Further, the volume of the space may be increased if the aforementioned circumferential ratio x:y is changed to a circumferential ratio of c:y {c<x, c∈$\mathbb{R}^+$} or if the circumferential ratio is changed to x:d {d>y, d∈$\mathbb{R}^+$}. As non-limiting examples, a liner comprising a first and second layer at a circumferential ratio of 3:5 will yield a space having a defined volume. Changing the circumferential ratio to either of 3:4 or 4:5 will result in a concomitant decrease in the defined volume of the space. On the other hand, changing the circumferential ratio of 3:5 to either of 2:5 or 3:6 will result in a concomitant increase in the defined volume of the space.

Figure 5A:
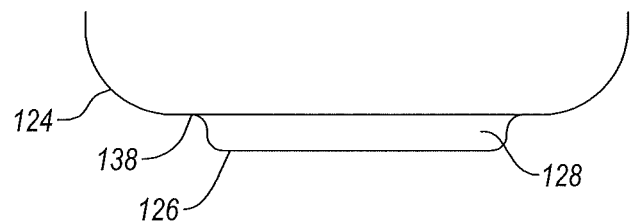
FIG. 5A illustrates a schematic representation of a vertical cross-section of an exemplary liner.
Figure 5B:
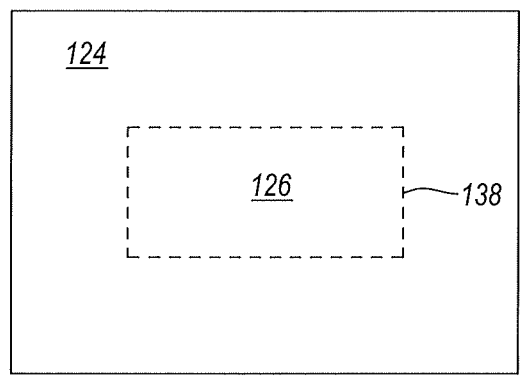
FIG. 5B illustrates a schematic representation of one embodiment of a top view of a liner depicted in FIG. 5A.
Figure 5C:
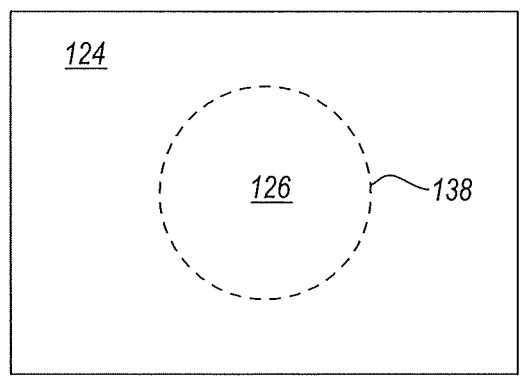
FIG. 5C illustrates a schematic representation of one embodiment of a top view of a liner depicted in FIG. 5A.

The first and second layers may, in some embodiments, be of differing sizes and/or shapes, as depicted in FIG. 5. FIG. 5A illustrates a vertical cross section of a liner having a first layer 124 and a second layer 126 joined at edge 138 and a space 128 created between the first and second layers 124, 126. As seen in FIGS. 5B-C, which illustrate different embodiments of FIG. 5A as depicted from an aerial perspective, the second layer 126 is joined to the first layer 124 at edge 138, wherein the edge 138 is inside the perimeter of the first layer. The second layer 128 may be the same shape as the first layer 124 (e.g., rectangular, as shown in FIG. 5B) or it may be a different shape as the first layer 124 (e.g., circular, as shown in FIG. 5C).

Although FIGS. 5B-C illustrate the second layer 126 being rectangular or circular in shape, it should be appreciated that the second layer may be any shape and/or may be attached to the first layer to form any shape at edge 138. Additionally, it should be appreciated that edge 138 may share at least a portion of the circumference of the first layer and the second layer in so far as edge 138 does not map to the entire circumference of the first layer. As a non-limiting example, the first and second layers may be rectangular and attached to one another, creating a space there between such that one perimeter side of the second layer is connected to at least a portion of one perimeter side of the first layer and the other three perimeter sides of the second layer are connected along a remaining edge, wherein the remaining edge is internal to the perimeter of the first layer.

In some embodiments, the first and second layers are the same size or substantially the same size and are connected to one another such that a space is created between the first and second layer. In some embodiments, the perimeter of the second layer is attached to the first layer along an edge, wherein the edge is entirely internal to the perimeter of the first layer. Because the first and second layers are substantially the same size—and therefore have substantially the same surface areas—the farther inside the perimeter of the first layer that the second layer is attached, the greater is the volume of the space created between the first and second layers. Additionally or alternatively, the volume of the space created between the first and second layers may be adjusted by increasing or decreasing the size of the second layer, even without moving the attachment edge within the first layer. For example, given a set attachment edge between the first and second layers that is within the perimeter of the first layer, the volume of the space created there between may be increased by increasing the size (e.g., the circumference) of the second layer and may be decreased by decreasing the size (e.g., the circumference) of the second layer. It should be appreciated that in some embodiments the size of the second layer should be greater than a minimum size, where the minimum size is derived from the size of the second layer whose surface area—as defined by the attachment edge created by joining the first and second layers—is substantially equivalent to the surface area of the portion of the first layer that is defined by the same attachment edge.

As described within the scope of this disclosure, two or more layers of a liner may be attached to one another, creating a space therebetween as in any of the foregoing embodiments. In some embodiments, the first liner comprises one or more apertures that allow the transport of liquid from the first layer to the space created between the first and second layers of the liner. In some embodiments, the apertures are selectively open, depending on the configuration of the liner and/or forces applied to one or more elements and/or surfaces of the liner, examples of which are provided in FIGS. 6-9. To that extent, FIGS. 6B, 7B, 8B, and 9B reflect the selectively open state of the apertures defined by liners in FIGS. 6A, 7A, 8A, and 9A, respectively.

Figure 6A:
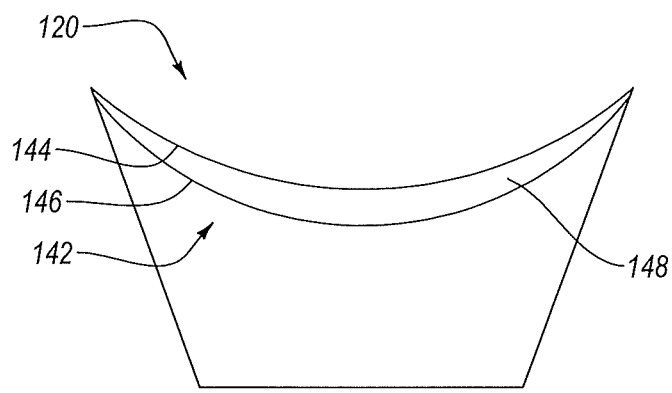
FIG. 6A illustrates a schematic representation of one embodiment having a liner associated with a basin.
Figure 6B:
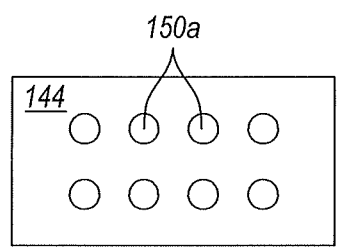
FIG. 6B illustrates a schematic representation of an open state of the apertures associated with the liner depicted in FIG. 6A.

Referring now to FIG. 6, depicted in FIG. 6A is a basin 120 comprising a liner 142 attached thereto. Liner 142 comprises a first layer 144 and a second layer 146 attached to the first layer, creating a space 148 between the first and second layers 144, 146. The first layer 144 includes a plurality of apertures 150 and, as depicted in FIG. 6B, the apertures are open 150a. In some embodiments, attaching liner 142 to basin 120 configures the first layer 144 in such a manner that the apertures are open 150a. This may be conformational in nature and/or based on the materials comprising the liner 142, particularly the first layer 144 of the liner 142. For example, the first layer 142 may be made and/or comprised of material that has elastic properties and/or is deformable, as known in the art, and the open state of apertures 150a corresponds to the conformation of liner 142 as attached to basin 120. In some embodiments, the liner may comprise one or more biodegradable materials having one or more of the foregoing properties.

Figure 7A:
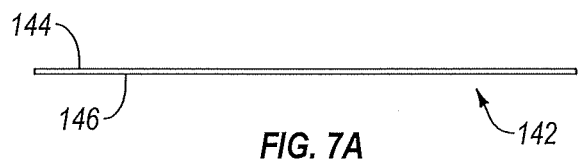
FIG. 7A illustrates a schematic representation of a prone liner.
Figure 7B:
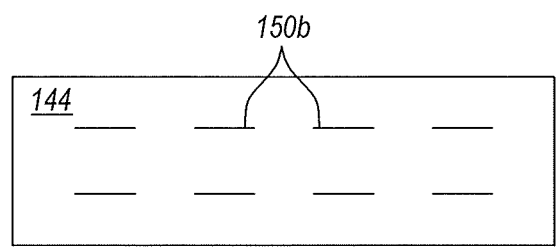
FIG. 7B illustrates a schematic representation of a closed state of the apertures associated with the liner depicted in FIG. 7A.

Referring now to FIG. 7, depicted in FIG. 7A is liner 142 from FIG. 6 where the liner 142 is prone and/or is positioned such that the liner 142 is substantially flat. In some embodiments, the liner 142 is substantially flat when the first layer 144 is substantially flat and/or taut. In such a prone and/or flat conformation, as depicted in FIG. 7A, the apertures are closed 150b, as shown in FIG. 7B. This may be due to conformational changes of liner 142—and consequently the apertures 150—as depicted between FIGS. 6A and 7A. For example, apertures 150 may be open 150a when the first layer is suspended in an at least partially arcuate manner and closed 150b when the first layer is taut and/or prone.

In some embodiments, the apertures spanning the first top surface and the first bottom surface of the first layer are collapsible. For example, the apertures may be collapsible when the first top surface moves laterally with respect to the first bottom surface. Particularly, the apertures may be columnar and/or prismatic with each opening of the aperture being defined by the first top and first bottom surfaces. When the first layer is suspended (e.g., within a basin) the aperture openings may be aligned, thereby promoting a configuration where the apertures are open. When the first layer is prone or sufficient pressure is applied to the first bottom surface, the first bottom surface may shift with respect to the first top surface, thereby promoting a configuration where the apertures are closed. In some embodiments, shifting the first bottom surface with respect to the first top surface comprises a lateral shift that collapses the apertures. The apertures may collapse, for example, along one edge of the aperture such that the aperture opening defined by the first top surface "falls" towards the first bottom surface at an angle. In a closed configuration as previously described, the walls of the apertures defined by the first layer pinch together, preventing any movement of liquid through the first layer. It should be appreciated that in some embodiments, the bottom surface shifting away from the top surface is the same as the top surface shifting with respect to the bottom surface—only the perspective has changed, not the outcome.

Figure 8A:
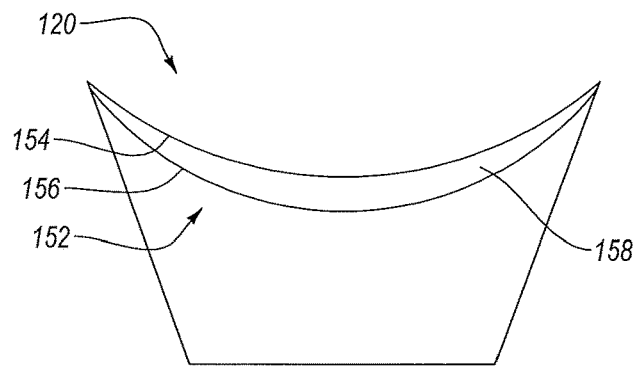
FIG. 8A illustrates a schematic representation of another embodiment having a liner associated with a basin.
Figure 8B:
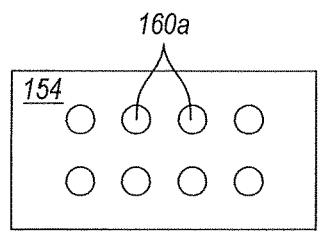
FIG. 8B illustrates a schematic representation of a open state of the apertures associated with the liner depicted in FIG. 8A.

Referring now to FIG. 8, illustrated in FIG. 8A is a liner 152 attached to basin 120, the liner comprising a first layer 154 and a second layer 156, wherein the second layer 156 is attached to the first layer 154 creating space 158 between the first and second layers 154, 156. Similar to FIG. 6A, where the liner 142 comprises open apertures 150a when attached to basin 120, the liner 152 attached to basin 120 in FIG. 8A comprises open apertures 160a, as illustrated by FIG. 8B.

Figure 9A:
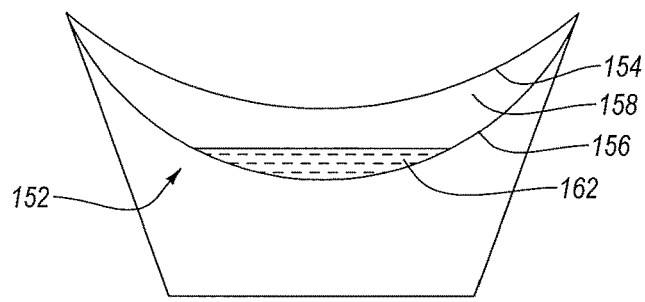
FIG. 9A illustrates a schematic representation of yet another embodiment having a liner associated with a basin.
Figure 9B:
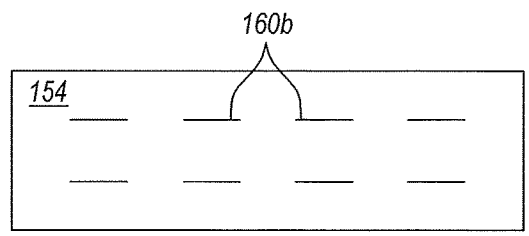
FIG. 9B illustrates a schematic representation of a closed state of the apertures associated with the liner depicted in FIG. 9A.

Referring now to FIG. 9, the apertures 160 may be selectively closed based on one or more pressures exerted directly or indirectly on the first layer 154. As depicted in FIG. 9A, liquid bio-waste 162 is retained within space 158 with the liquid bio-waste 162 resting on the top surface of the second layer 156. Gravitational forces acting upon the liquid bio-waste 162 within space 158 increase the pressure applied to the second layer 156 to a greater degree than when there is no liquid bio-waste 162 within space 158 (e.g., as in FIG. 8A). These and potentially other forces and/or pressures affecting the second layer 156 may at least partially and/or indirectly affect the conformation of the first layer 154.

For example, the forces applied to the second layer may cause the second layer to bow, flex, and/or stretch. This may in turn result in one or more stresses to be applied to the connecting edge between the first and second layers, and consequently, at least a portion of those one or more stresses may additionally impact the first layer. The first layer may, for example, becomes taut as a result of the stresses and/or pressures directly affecting the second layer and indirectly affecting the first layer. In some embodiments, a tightening of the first layer may cause the apertures to close. The apertures may, in some embodiments, close parallel to the strongest forces exerted on the first layer.

The transport of liquid bio-waste from the first layer to the space created by the first layer and the second layer is, in some embodiments, a passive process. That is, the passive process of at least partially separating the liquid and solid bio-waste at the liner will occur even without the active addition of energy to the process. In some embodiments, the energy for at least partially separating the liquid and solid bio-waste comes from the force of gravity.

In some embodiments, the second layer may expand and/or stretch as additional forces are applied to it. For example, the second layer may stretch, thereby increasing the volume of the space created between the first and second layers, as the volume of liquid bio-waste increases within the space. In some embodiments, the second layer is rigid and/or cannot expand and/or stretch beyond a particular threshold. This may, in turn, limit the total volume of fluid that may be received within the space defined by the first and second layers of the liner. The liner 152 of FIGS. 8 and 9 may, in some embodiments, comprise apertures 160 that close after a specific volume of liquid bio-waste is received within space 158. For example, open apertures 160a may allow, as a non-limiting example, up to 250 milliliters (mL) of urine and/or other liquid bio-waste to pass into space 158 at which time the apertures close. In some embodiments, the space 158 may accept a volume of 50 mL, 75, mL, 100 mL, 150 mL, 200 mL, 250 mL, 300 mL, 350 mL, 400 mL, 500 mL, 550 mL, 600 mL, 750 mL, 1 liter (L), 1.25 L, 1.5 L, 1.75 L, 2 L, 3 L, 4 L, 5 L, 7.5 L, or 10 L of urine at which time the apertures close. The closing of open apertures 160a may be directly related to the volume received within space 158, but it may additionally or alternatively be a result of the weight of the volume of liquid bio-waste received within space 158. That is, as the volume of liquid bio-waste increases within space 158, the pressure exerted on the second layer 156 increases as well, and because the liquid bio-waste is being transported from the first layer to essentially rest on the second layer, there is a transfer of applied pressure from the first layer to the second layer concomitant with transport of the liquid bio-waste. In some embodiments, the first and second layers are attached and increased pressure on the second layer may cause it to bow and/or flex while decreased pressure on the first layer may release the bowing and/or flexing of that layer. These fluctuations may affect the open state of apertures such that the apertures close upon flexing and/or bowing of the second layer.

In some embodiments, the selective closing of apertures may provide the benefit of maintaining recovered urine in a completely sterile, mostly sterile, or partially sterile state. Under most conditions, urine micturated from healthy people is sterile. Feces, on the other hand, are not sterile, regardless of the health state of the defecating person. Fresh feces comprise roughly 75% water, and anywhere from about a quarter to over half the remaining fraction is bacterial biomass. Though the majority of bacterial biomass is presumed dead, a significant portion of the bacterial biomass is living—some of which may be pathogenic. Thus, mixing fecal water and/or fecal mass with urine is likely to contaminate the otherwise sterile waste product. Accordingly, a liner as described above, which selectively closes the apertures after a particular volume of liquid is obtained, may promote the sterile recovery of urine by closing the apertures on the first layer before fecal matter is received at the first layer.

In some embodiments, fecal water—but not fecal solids—may be transported to the space defined by the first and second layer along with urine, or the urine may otherwise become contaminated by feces. The urine may be collected and sterilized once again by methods known in the art followed by repurposing as fertilizer, potable water, or other applications.

Figure 10A:
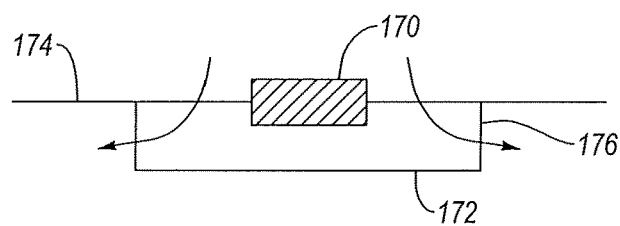
FIG. 10A illustrates a schematic representation of an open state of an exemplary one-way valve.
Figure 10B:
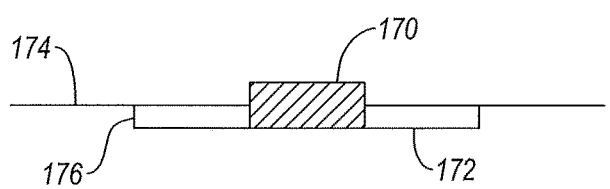
FIG. 10B illustrates a schematic representation of a closed state of the one-way valve depicted in FIG. 10A.
Figure 11A:
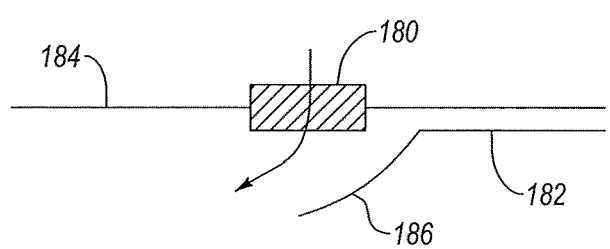
FIG. 11A illustrates a schematic representation of an open state of another exemplary one-way valve.
Figure 11B:
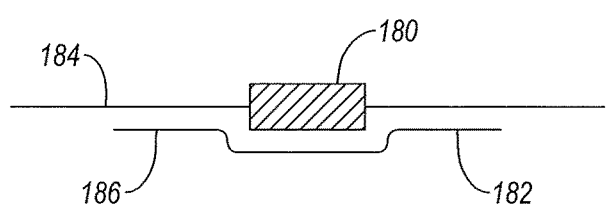
FIG. 11B illustrates a schematic representation of a closed state of the one-way valve depicted in FIG. 11A.

Referring now to FIGS. 10A, 10B, 11A and 11B, depicted are exemplary implementations of one-way valves that may be incorporated into one or more of the liners described above. 10A and 10B illustrates the first layer 174 of a liner that comprises an aperture 170 and one-way valve 172, the one-way valve 172 comprising flexible arms 176. As shown by comparing FIGS. 10A and 10B, the one-way valve 172 may be opened (FIG. 10A) or closed (FIG. 10B).

Similar to FIGS. 10A and 10B, FIGS. 11A and 11B illustrates a first layer 184 of a liner that comprises and aperture 180 and a one-way valve 182, the one-way valve 182 comprising a flap 186 for controlling the open (FIG. 11A) and closed (FIG. 11B) state of the one-way valve 182. In some embodiments, the one-way valve 182 of FIG. 11 comprises a flap 186 partially attached to the bottom side of the first layer 184 and selectively covers an aperture. The one-way valves illustrated in FIGS. 10A, 10B, 11A and 11B allow the unidirectional flow of fluids through the first layer. In some embodiments, the one-way valves are opened after sufficient pressure has been applied to the originating side and closed again when the pressure decreases below a threshold required for keeping the one-way valve open. In some embodiments, the pressure may build up on the originating side as bio-waste is deposited onto the first layer. In some embodiments, the one-way valve may restrict the movement of liquid bio-waste back to the originating side (e.g., restricts movement from the bottom side of the first layer to the top side of the first layer). The one-way valves of FIGS. 10A, 10B, 11A and 11B and the aforementioned apertures may, in some embodiments, be located on the first layer of the disclosed commode liner.

Figure 12A:
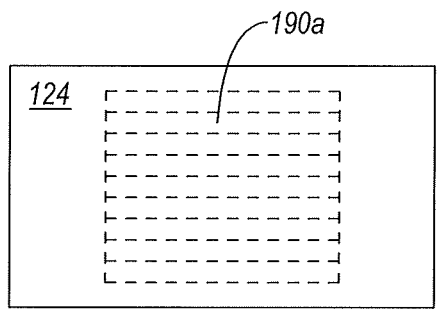
FIG. 12A illustrates a schematic representation of an exemplary spatial organization of apertures on a liner.
Figure 12B:
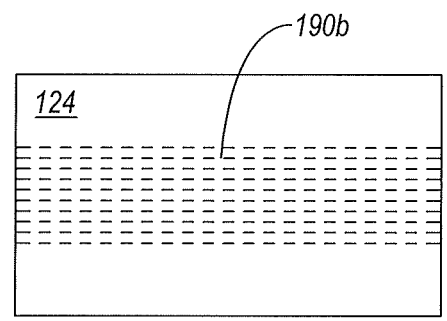
FIG. 12B illustrates a schematic representation of an exemplary spatial organization of apertures on a liner.

Referring now to FIGS. 12A, 12B, 12C, 12D and 12E, depicted are aerial views of various first layers 124, wherein each first layer 124 represents an exemplary spatial organization scheme of apertures 190 on the first layer 124. For example, FIGS. 12A and 12B depict liners 124 comprising a plurality of apertures 190a, 190b organized in the middle third of the first layer 124. The apertures 190a of FIG. 12A, though spaced in the middle third of the first layer 124, differ from the spatial organization of apertures 190b depicted in FIG. 12B in that the apertures 190a of FIG. 12A are in the middle third of the first layer 124 as determined by a first axis (e.g., the vertical axis) of the first layer 124. That is, the first and third vertical portions of the first layer 124 do not contain any apertures, and the second (i.e., middle) vertical portion of the first layer 124 comprises all of the depicted apertures 190a. The apertures 190b of FIG. 12B are spatially organized on the first layer 124 according to a second axis (e.g., the horizontal axis) of the first layer 124 such that the first and last horizontal third of the first layer 124 does not contain any apertures, where the middle third comprises all of the depicted apertures 190b.

While the foregoing description particularly describes the plurality of apertures being organized on the first layer based on relative positioning of the apertures within respect to one of three portions of first layer, it should be appreciated that the apertures may be organized on the first layer based on any ordered division of the first layer (e.g., by halves, by fourths, by fifths, by tenths, etc.), and the ordered divisions do not need to be equally partitioned. Also within the scope of this disclosure, the apertures may be spatially organized on the first layer converse to the recited organization, and in any permutable pattern of spatial organization. As a non-limiting example, the apertures 190a of FIG. 12A may be organized in the first and third portions of the first layer 124 instead of in the depicted second portion of the first layer 124.

Figure 12C:
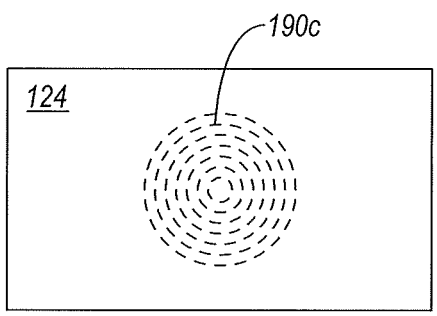
FIG. 12C illustrates a schematic representation of yet another exemplary spatial organization of apertures on a liner.
Figure 12D:
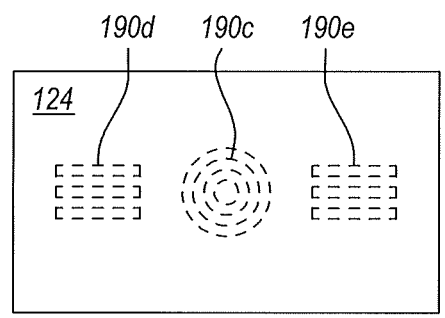
FIG. 12D illustrates a schematic representation of yet another exemplary spatial organization of apertures on a liner.

In some embodiments, including any of the foregoing and forthcoming disclosed embodiments, the first layer may comprise a plurality of apertures. The apertures may be evenly spaced from one another, may be randomly spaced from one another, and/or may be spaced according to any pattern. For example, FIG. 12C illustrates a first layer 124 comprising a plurality of apertures 190c that are uniformly sized and uniformly spaced in a circular pattern. As a further non-limiting example, FIG. 12D illustrates the first layer 124 and plurality of apertures 190c of FIG. 12C with a second plurality of apertures 190d organized in a rectangular shape adjacent to apertures 190c. FIG. 12D further illustrates a third plurality of apertures 190e organized in a rectangular shape which are adjacent to apertures 190c but on an opposing side of apertures 190c with respect to apertures 190d.

Figure 12E:
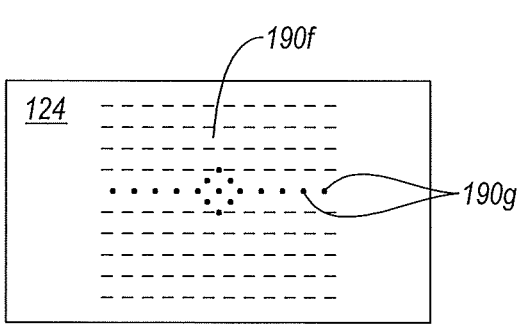
FIG. 12E illustrates a schematic representation of another spatial organization of apertures on a liner.

Additionally or alternatively, the size and/or shape of the plurality of apertures may be uniform, or one or more apertures of the plurality of apertures may be a different size and/or different shape than one or more other apertures of the plurality of apertures. For example, FIG. 12E illustrates a plurality of apertures 190f of substantially the same size that are substantially evenly spaced across substantially the entire first layer 124. The first layer 124 of FIG. 12E further comprises a plurality of apertures 190g in a biconical shape, the plurality of apertures 190g being of a different, larger size than apertures 190f. One or more apertures depicted in FIG. 12 may comprise one-way valves.

In some embodiments, the placement of apertures on the first surface correlates with the placement of one or more second layers in the liner such that one or more spaces created between the first and second layers of the liner are directly below the apertures of the first layer. For example, an exemplary liner depicted in FIG. 12D may have a single second layer attached at the perimeter of the depicted first liner such that a single space is created there between, and any apertures transporting liquid from the first layer will transport liquid into a single space created between the first and second layers. Alternatively, the second layer could be separately attached to the first layer beneath each of apertures 190c, 190d, and 190e such that liquid transported through apertures 190c are transported to a space directly beneath apertures 190c but not connected to either of spaces created beneath apertures 190d or 190e. In some embodiments, a single aperture may transport liquid into a single space whereas a plurality of apertures (e.g., apertures 190d) may transport liquid into multiple spaces. That is, a first subset of apertures taken from a plurality of apertures may transport liquid to a space beneath the subset of apertures, whereas a second subset of aperutres taken from the same set of a plurality of apertures may transport liquid to a second space beneath the second subset of apertures. For example, the plurality of apertures 190d may have two subsets of apertures, a left set and a right set such that the left set of apertures comprises apertures on the left half of the plurality of apertures 190d and the right set of apertures comprises all apertures on the right half of the plurality of apertures 190d. The left set of apertures may drain into a space positioned beneath the left set, and the right set of apertures may separately drain into a space positioned beneath the right set of apertures without mixing the contents of the space beneath the left set of apertures.

In some embodiments, the placement of apertures on the first layer may be intentional. For example, a plurality of apertures may be placed at a position on the first layer that is more likely to receive and/or interact with liquid bio-waste and less likely to receive and/or interact with solid bio-waste. As a non-limiting example, a commode liner as described herein that is attached to a basin may have a plurality of apertures clustered towards the front of the basin and no apertures in the middle of the liner. A person sitting at the commode may urinate towards the front of the basin, allowing the liner to aseptically recover at least a portion of the urine through the apertures placed near the front of the basin, and there may be a lack of apertures on the first layer in the middle and towards the back of the liner such that when the user defecates, the feces are caught by the first layer but no fecal water or other fecal fluid can be transported across the first layer due to the lack of apertures. The first layer is, therefore a permeable barrier for urine and an impermeable barrier with respect to feces. It should be appreciated that spatial combinations other than those that have been described herein may be used for recovering liquid bio-waste (e.g., urine), and the placement, size, and/or shape of apertures may be adapted to particular purposes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A liner for a commode that allows passive urine recovery, comprising:
   a first layer, comprising:
      a first top side configured to receive a bio-waste material;
      a first bottom side; and
      a plurality of apertures spanning the first top side and the first bottom side, wherein the plurality of apertures comprise a plurality of one-way valves configured to enable passive unidirectional movement of a liquid portion of the bio-waste material from the first top side to the first bottom side and at least partially restrict the movement of the liquid portion from the first bottom side to the first top side; and
   a second layer attached to the first layer, the second layer comprising a second top side disposed adjacent to the first bottom side, wherein the second layer is attached to the first layer such that a space is created between the second top side and the first bottom side, wherein the space is configured to hold the liquid portion of the bio-waste material received at the first top side.

2. The liner as in claim 1, further comprising a closure mechanism configured to close the liner such that the bio-waste material is retained within the liner when the liner is closed.

3. The liner as in claim 1, wherein the liner is configured to be suspended in a commode or laid in a prone position, wherein the plurality of apertures are configured to open when the liner is suspended in a commode and configured to closed when the liner is in a prone position.

4. The liner as in claim 1, wherein one or more of the plurality of one-way valves comprise a flap partially attached to the first bottom side and selectively covering one or more of the plurality of apertures.

5. The liner as in claim 1, wherein the first top side retains a solid portion of the bio-waste material.

6. The liner as in claim 1, wherein the liquid portion comprises urine, a liquid part of fecal matter, or a combination thereof.

7. The liner as in claim 1, wherein the surface area of the first bottom side and the surface area of the second top side define the space and the surface area of the first bottom side is less than the surface area of the second top side.

8. The liner as in claim 1, wherein the space is expandable.

9. The liner as in claim 1, wherein at least one of the first layer and the second layer comprise a biodegradable material.

10. The liner as in claim 1, wherein a size or shape of the plurality of apertures is uniform.

11. The liner as in claim 1, wherein the plurality of apertures comprise one or more different sized apertures.

12. The liner as in claim 1, wherein the plurality of apertures are confined to one or more areas of the first layer.

13. The liner as in claim 1, further comprising a mounting mechanism for removably securing the liner to the commode.

14. A liner for a commode that allows for passive urine recovery, comprising:
   a first layer, comprising:
      a first top side configured to receive a bio-waste material;
      a first bottom side; and
      a plurality of apertures spanning the first top side and the first bottom side, the plurality of apertures being configured to open to enable passive unidirectional movement of the liquid portion of the bio-waste material from the first top side to the first bottom side and to close to at least partially restrict the movement of the liquid portion from the first bottom side to the first top side;
   a second layer attached to the first layer, the second layer comprising a second top side disposed adjacent to the first bottom side, wherein the second layer is attached to the first layer such that a space is created between the second top side and the first bottom side, wherein the space is configured to hold a liquid portion of the bio-waste material received at the first top side; and
   a closure mechanism configured to close the liner such that the bio-waste material is retained within the liner when the liner is closed.

15. The liner as in claim 14, wherein the plurality of apertures comprise a plurality of one-way valves.

16. The liner as in claim 14, wherein a size or shape of the plurality of apertures is uniform and the plurality of apertures are confined to one or more areas of the first layer.

17. A system for passive urine recovery, the system comprising:
   a bio-waste cart receivable at least partially within a bio-waste receptacle, the bio-waste cart comprising a base and a basin for receiving bio-waste deposited at the bio-waste receptacle; and
   a liner associated with the basin of the bio-waste cart, the liner comprising:
      a first layer, comprising:
         a first top side configured to interface with a bio-waste material received at the bio-waste receptacle;
         a first bottom side; and
         a plurality of apertures spanning the first top side and the first bottom side, the plurality of apertures being configured to open to enable passive unidirectional movement of the liquid portion of the bio-waste material from the first top side to the first bottom side and to close to at least partially restrict the movement of the liquid portion from the first bottom side to the first top side;
      a second layer attached to the first layer, the second layer comprising a second top side disposed adjacent to the first bottom side, wherein a space is created between the second top side and the first bottom side, wherein the space is configured to hold a liquid portion of the bio-waste material interfacing with the first top side.

18. The system in claim 17, wherein the plurality of apertures comprise a plurality of one-way valves.

19. The system in claim 18, further comprising a closure mechanism configured to close the liner such that the bio-waste material is retained within the liner when the liner is closed.

* * * * *